(12) United States Patent
Shinoda et al.

(10) Patent No.: US 6,638,597 B1
(45) Date of Patent: Oct. 28, 2003

(54) MAGNETO-OPTICAL RECORDING MEDIUM

(75) Inventors: Masataka Shinoda, Kanagawa (JP); Yasuhito Tanaka, Tokyo (JP); Takashi Shimouma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/697,473

(22) Filed: Oct. 26, 2000

(30) Foreign Application Priority Data

Oct. 29, 1999 (JP) ......................... P11-309153

(51) Int. Cl.$^7$ ............................. G11B 11/105
(52) U.S. Cl. .................. 428/141; 428/212; 428/409; 428/694 RE; 428/694 MM; 369/13.43; 369/13.45
(58) Field of Search ............... 428/694 MM, 428/694 RE, 668, 212, 141, 409; 369/13, 13.43, 13.45

(56) References Cited

U.S. PATENT DOCUMENTS

| | | | |
|---|---|---|---|
| 5,561,089 A | | 10/1996 | Ishizaki et al. |
| 5,966,349 A | * | 10/1999 | Suwabe et al. .......... 369/13.45 |
| 6,178,143 B1 | * | 1/2001 | Hirokane et al. ............. 369/13 |
| 6,180,268 B1 | * | 1/2001 | Tamanoi et al. ..... 428/694 ML |
| 6,268,073 B1 | * | 7/2001 | Chen .................. 428/694 ML |
| 6,400,656 B1 | * | 6/2002 | Tanase et al. ............ 369/13.43 |

FOREIGN PATENT DOCUMENTS

| | | |
|---|---|---|
| EP | 0606155 | 7/1994 |
| EP | 0632437 | 1/1995 |
| EP | 0740296 | 10/1996 |
| JP | 06231498 | 8/1994 |
| JP | 08017080 | 1/1996 |
| JP | 08147782 | 6/1996 |
| JP | 08221827 | 8/1996 |
| JP | 10064131 | 3/1998 |

OTHER PUBLICATIONS

Shinoda, M., Tanaka, Y., Akiyama, Y., Imanishi, S., Kanno, M. (Optical Data Storage, 2000. Conference Digest, 2000).*
Yamaguchi, A., Suzuki, Y., Tanase, K., Sumi, S., Torazawa, K. (IEEE Trans. Mag., 33(5), 1997, 3217–3219).*
Suzuki, Y., Tanase, K., Yamaguchi, A., Murata, S., Sumi, S., Torazawa, K. (IEEE Trans. Mag., 32(5), 1996, 4067–4069).*
IEEE Xplore search report.*

* cited by examiner

Primary Examiner—Paul Thibodeau
Assistant Examiner—Kevin M. Bernatz
(74) Attorney, Agent, or Firm—Sonnenschein, Nath & Rosenthal LLP

(57) ABSTRACT

In order to improve reproduction characteristics of a magneto-optical recording medium in a case of being subject to a magnetically induced super resolution readout process utilizing a blue-violet laser beam, there is provided a magneto-optical recording medium having a surface roughness of 0.3 nm or less on a surface of a substrate on which recording/reproduction magnetic layers are formed or a surface of a dielectric film formed on the substrate.

10 Claims, 6 Drawing Sheets

FIG. 4

| REPRODUCTION WITH A RED LASER BEAM (WAVELENGTH OF 635 nm) | | | |
|---|---|---|---|
| RECORDED MARK LENGTH | CARRIER LEVEL | NOISE LEVEL | C / N |
| 0.4μm | -8dBm | -54dBm | 46.0dB |
| 1.6μm | 0.5dBm | -52.5dBm | 53.0dB |

FIG. 5

| REPRODUCTION WITH A BLUE-VIOLET LASER BEAM (WAVELENGTH OF 406 nm) | | | |
|---|---|---|---|
| RECORDED MARK LENGTH | CARRIER LEVEL | NOISE LEVEL | C / N |
| 0.4μm | -14dBm | -59dBm | 45.0dB |
| 1.6μm | -8dBm | -57dBm | 49.0dB |

FIG. 6

|  | DISK 1 | DISK 2 |
|---|---|---|
| C/N (MARK LENGTH 0.25 μm) | 43.5dB | 41.5dB |
| NOISE (MARK LENGTH 0.25 μm) | -68.7dBm | -67.0dBm |
| C/N (MARK LENGTH 1.0 μm) | 52.5dB | 51.0dB |
| NOISE (MARK LENGTH 1.0μm) | -67.2dBm | -65.2dBm |
| JITTER (BIT LENGTH 0.19 μm) | 9.9% | 11.6% |
| SUBSTRATE SURFACE ROUGHNESS | 0.25nm | 0.35nm |

FIG. 7

|  | DISK 3 | DISK 4 | DISK 5 |
|---|---|---|---|
| C/N (MARK LENGTH 0.25 μm) | 44.0dB | 43.0dB | 41.0dB |
| NOISE (MARK LENGTH 0.25 μm) | -69.4dBm | -68.6dBm | -67.2dBm |
| C/N (MARK LENGTH 1.0 μm) | 52.8dB | 51.9dB | 50.0dB |
| NOISE (MARK LENGTH 1.0 μm) | -67.2dBm | -66.0dBm | -64.2dBm |
| JITTER (BIT LENGTH 0.19 μm) | 9.8% | 10.0% | 12.0% |
| SUBSTRATE SURFACE ROUGHNESS | 0.25nm | 0.30nm | 0.38nm |

FIG. 8

|  | DISK 6 | DISK 7 | DISK 8 |
|---|---|---|---|
| C/N (MARK LENGTH 0.25 μm) | 43.0dB | 40.0dB | 38.5dB |
| NOISE (MARK LENGTH 0.25 μm) | 67.5dBm | -66.0dBm | -65.6dBm |
| C/N (MARK LENGTH 1.0 μm) | 51.9dB | 50.0dB | 49.0dB |
| NOISE (MARK LENGTH 1.0 μm) | -66.2dBm | -64.7dBm | -63.9dBm |
| JITTER (BIT LENGTH 0.19 μm) | 10.0% | 13.5% | 15.0% |
| FIRST DIELECTRIC FILM SURFACE ROUGHNESS | 0.30nm | 0.48nm | 0.69nm |

MAGNETO-OPTICAL RECORDING MEDIUM

RELATED APPLICATION DATA

The present application claims priority to Japanese Application No. P11-309153 filed Oct. 29, 1999, which application is incorporated herein by reference to the extent permitted by law.

BACKGROUND OF THE INVENTION

1. Field of the Invention

The present invention relates to a recording medium that is read by a laser beam utilizing a magneto-optical effect. More particularly, the present invention relates to a magneto-optical recording medium comprising at least a reproduction layer and a recording layer, on which a readout process based on magnetically induced super resolution is carried out utilizing a blue-violet laser beam, that is, a laser beam having a wavelength of 350 nm to 450 nm.

2. Description of the Related Art

There is a method for rewritably recording a data signal with high density using a magneto-optical recording means. This method comprises utilizing the thermal energy of a laser beam to initially cause a partial portion of a magnetic layer of a magneto-optical recording medium to be heated beyond the Curie temperature or the compensation temperature. The method also includes causing the coercive force in the heated portion to be decreased or extinguished, and then causing the direction of magnetization of the heated portion to be inverted into the direction of a recording magnetic field that is externally added to form an information magnetic domain, so as to execute the recording of the data signal.

The above-cited magneto-optical recording medium comprises a transparent substrate, such as a polycarbonate resin, having a main surface. The recording medium further comprises a plurality of layers sequentially laminated on the main surface of the substrate. The sequentially laminated layers comprise: a dielectric film that may be made of silicon nitride or aluminum nitride; a magnetic recording layer that may be made of an amorphous film of rare-earth transition-metal alloy and that is provided with an easy axis of magnetization in the vertical direction with regard to a film surface and that has a surpassing magneto-optical-effect characteristic. The plurality of layers further includes another dielectric film that may be made of silicon nitride or aluminum nitride; a reflection layer composed of aluminum, gold, or silver; and a protection layer, which may be made of an ultraviolet-ray-cured type resin.

By causing the above-cited magneto-optical recording medium to be exposed to a laser beam irradiated from the side of the transparent substrate, the above-cited information magnetic domain may be formed, such that the recording of the data signal is executed against the magnetic layer.

To reproduce the recorded data signal, the magneto-optical recording medium is exposed to a laser beam irradiated from the side of the above-cited transparent substrate to detect the actual rotating angle of the magnetized or polarized surface via a magneto-optical effect, such as the Kerr effect, which is generated in the information magnetic domain in the magnetic layer to execute reproduction of the recorded data signal.

The linear recording density of optical disks (such as the magneto-optical recording medium, a disc for digital audio recording, a disc for digital video recording or the like) is also determined by the signal-to-noise (S/N) ratio in the course of performing reproduction in most cases. And yet, the amount of the recorded data signal read under reproduction mode is dependent on the cyclic period of bit array of the recorded data signal, the wavelength ($\lambda$) of the laser beam, and the numerical aperture (N.A.) of the objective lens.

More specifically, the bit cyclic period ("f") is determined by the laser wavelength ($\lambda$) of the reproduction optical system and also by an optical detection limit of the optical system. The optical detection limit may be an optical refraction limit determined by the numerical aperture (N.A.) of the objective lens. More precisely, the bit cyclic period ("f") at the optical detection limit is defined by equation expressed by way of "$f=\lambda/(2\ N.A.)$".

Accordingly, in order to realize higher density recording of a data signal in the magneto-optical recording medium, the laser wavelength ($\lambda$) of the reproduction optical system may be shortened or the numerical aperture (N.A.) of the objective lens may be increased. However, within the current technology, improvement of the laser wavelength ($\lambda$) of the laser beam and the numerical aperture (N.A.) of the objective lens are limited.

In recent years, modem technology has developed a semiconductor laser having a wavelength of around 400 nm. For example, a GaN semiconductor laser is capable of producing a blue-violet laser beam having a laser wavelength of 350 nm to 450 nm. On the other hand, a numerical aperture (N.A.) of an objective lens that is about 0.7 may be obtained by a resin mold.

In view of the above-described circumstances, there have been a number of studies, developments, and suggestions with regard to structures of a magneto-optical recording medium and methods for recording and reproducing such a medium.

As for the recording method, a so-called "mark length recording method" has been suggested. According to the "mark length recording method," an information mark is recorded not by a method in which information is recorded according to the presence of a mark (i.e., the so-called "mark position recording method"), but by a method in which a linear density of the recording medium is achieved by varying the length of the mark to make an edge portion thereof to record the information.

Another recording method, "a laser pulse irradiation magnetic field modulating recording method," has also been suggested. According to this recording method, a recording laser beam is irradiated so that a waveform thereof is made to be a pulse form, not a continuous waveform, in accordance with a phase of an external magnetic field. This method results in prevention of unnecessary expansion in a track direction of the recording medium, reduction of cross-write and cross-erase in adjacent tracks, and improvement in track density.

On the other hand, there have been suggested a number of "magnetically induced super resolution readout methods," as a reproducing method.

In order to realize the above "magnetically induced super-resolution readout method", a magneto-optical recording medium comprising at least a reproduction layer and a recording layer is introduced. This method comprises a process for causing the data signal recorded on the recording layer, which may have high coercive force, to be transferred onto the reproduction layer. In this method, a polarized surface is subject to rotation by a magneto-optical effect (e.g., Kerr effect) of the reproduction layer generated by a laser beam irradiated onto the reproduction layer. By detecting the rotation of the polarized surface, readout (reproduction) of the recorded data is executed. In this case, by using the reproducting laser beam to form a thermal distribution within a spot in the reproduction layer, a part of the recorded data signal is emerged in the spot of the reproduction layer in order that the optical reader can restrictively read a single information magnetic domain within the spot, thus making it possible to reproduce the information magnetic domain based on a cyclic period being less than the bit cyclic period at the above-described optical detection limit.

The magnetically induced super-resolution readout method described above is disclosed in Japanese Patent Application Publication Laid-Open No. HEISEI-1-143041/1989 and also in Japanese Patent Application Publication Laid-Open HEISEI-1-143042/1989, both being a basic application of the U.S. Pat. No. 5,018,119. The magneto-optical recording medium used for implementing the magnetically induced super-resolution readout method essentially comprises a reproduction (readout) layer, an intermediate layer, and a recording layer, which are magnetically coupled with each other at room temperature. When performing the magnetically induced super-resolution readout method, the recorded information magnetic domain of the reproduction layer heated within the irradiated laser beam spot expands or contracts or inverts at a portion bearing higher temperature, resulting in a decrease in interference between data marks during the reproduction process. This decrease in interference makes it possible to perform the reproduction process based on a cyclic period being less than the limit of optical refraction of the optical system, enabling linear recording density and track-recording density to be increased as is proposed by the above-disclosed inventions.

Further, as a part of the above-described magnetically induced super resolution readout method, there is another art called "Center Aperture Detection type Magnetic Super Resolution" ("CAD-MSR" hereinafter) that is used primarily to read the recorded bit (i.e., the magnetized recording domain) at the center portion of the reproducing laser-beam spot based on the method disclosed in the Japanese Patent No. 2839783 (Japanese Patent Application Publication Laid-Open HEISEI-5-081717/1995), a basic application of U.S. Pat. No. 5,707,727.

FIG. 2 depicts a schematic cross-sectional view of an exemplary magneto-optical recording medium of the present invention that may be used to implement the above-identified CAD-MSR readout method. The magneto-optical recording medium shown in FIG. 2 comprises the following: a transparent substrate 10 (which may be made-of polycarbonate resin) on which a first dielectric film 5, a reproduction (readout) layer 1, an auxiliary reproduction layer 2, a non-magnetic intermediate layer 4, a recording layer 3, a second dielectric film 6, and a thermal-control layer 7 are laminated in the upward direction. Further, a protection layer 8 may be superficially formed on the top surface of the thermal-control layer 7.

FIG. 3 depicts a schematic cross-sectional view of a portion of the magneto-optical recording medium in FIG. 2, which comprises the reproduction (readout) layer 1, the auxiliary reproduction layer 2, the non-magnetic intermediate layer (cut-off layer) 4, and the recording layer 3. Of these, both the reproduction layer 1 and auxiliary reproduction layer 2 are respectively composed of a magnetic layer having in-plane magnetic anisotropy. The recording layer 3 comprises a magnetic layer having perpendicular magnetic anisotropy, whereas the non-magnetic intermediate layer 4 comprises a non-magnetic-material layer.

As shown in FIG. 3, a recorded mark M is recorded in response to recording a data signal, such that a corresponding information magnetic domain, is formed (i.e., recorded) on the recording layer 3.

Note that outline arrows shown in FIG. 3 schematically show the direction of magnetization.

Reading (in other words, reproduction) a recorded data signal from the magneto-optical recording medium based on the above-referred CAD-MSR method is carried out by irradiating the magneto-optical recording medium with a reproducing laser beam L through an optical lens 11, i.e., an objective lens. Due to the irradiation by the reproducing laser beam L, the magnetized effect disappears from the heated portion I of the auxiliary reproduction layer 2 to cause a reproducing window W, i.e., an aperture, to be formed in the auxiliary reproduction layer 2. The reproducing window W defines a demagnetized portion in the layer 2. The reproduction layer 1 may then be magnetically coupled with the recording layer 3 via the reproducing window W to allow the recorded mark M to be transferred onto the reproduction layer 1. Next, the transferred recorded mark M may cause the reproducing laser beam to generate the Kerr rotation. By detecting the actual angle of the Kerr rotation performed by the returning laser beam, the recorded data signal may be read.

As was described earlier, while performing reproduction of a variety of data in accordance with the magnetically induced super-resolution readout method by lowering the limit of the refraction of a blue-violet laser beam having a wavelength of 350 nm to 450 nm, it is possible to secure high density that is more than double the conventional magnetically induced super-resolution readout method, which uses a conventional red laser beam having a wavelength of approximately 600 nm to 800 nm.

Nevertheless, when utilizing such a blue-violet laser beam, the signal amount (carrier level) is lowered, which raises problems such as a decrease in carrier-to-noise (C/N) ratio and an increase in the amount of jitter.

A rare-earth transition-metal magnetic film utilized as a conventional magneto-optical recording medium (for example, a thin amorphous alloy film of TbFeCo or GdFeCo) is known to have an undesirable characteristic feature where the Kerr rotational angle or the Faraday rotational angle (both exhibiting a magneto-optical effect that is in proportion with a signal amount (carrier level) of the magneto-optical recording medium) is decreased in a region of a blue-violet laser beam having a wavelength of 350 nm to 450 nm.

In addition, a conventional Si photo-detector for detecting a reproducing beam is known to have a characteristic feature where a signal amount (carrier level) at the time of converting optical information obtained from magnetized information recorded in the recoding medium into an electrical signal is decreased (i.e., photo-detector sensitivity decreases) due to deterioration of quantum efficiency in the wavelength region of 350 nm to 450 nm.

Accordingly, as described above, when performing the magneto-optical recording/reproducing method utilizing a blue-violet laser beam having a wavelength of 350 nm to 450 nm an improvement in the limit of optical detection may be realized due to the shorter wavelength of the blue-violet laser beam. But performing this method using the blue-violet laser beam also causes deterioration in the magneto-optical effect due to the shorter wavelength of the blue-violet laser beam and deterioration in a signal amount (carrier level) due to deterioration in photo-detector sensitivity, which results in deterioration in carrier-to-noise (C/N) ratio and increase of jitter.

The C/N ratio and the jitter at the time the mark signals are randomly recorded depend on various conditions, such as compositions, film thickness, film forming conditions or the like of respective magnetic layers of the magneto-optical recording medium. However, even if these conditions are optimized, the C/N ratio and the jitter are deteriorated in a case where the magnetically induced super resolution readout is carried out by utilizing a blue-violet laser beam, in comparison with a case of utilizing a conventional red laser beam having a wavelength of 600 nm to 800 nm.

FIG. 4 shows measurement results of carrier level, noise level and C/N in a case of utilizing a red laser beam having a wavelength of 635 nm. FIG. 5 shows the same in a case of utilizing a blue-violet laser beam having a wavelength of 406 nm.

The measurements for both the red laser beam and the blue-violet laser beam were carried out under the following conditions: a numerical aperture (N.A.) of an objective lens of measurement apparatus is 0.6, a track pitch of the magneto-optical recording medium is 0.55 μm, and recorded mark lengths are 0.4 μm and 1.6 μm.

As apparent from FIGS. 4 and 5, in a case of reading out a recorded mark of the same length, the carrier level, noise level and C/N ratio are all deteriorated when utilizing the blue-violet laser beam.

SUMMARY OF THE INVENTION

A method and an apparatus consistent with the present invention provides a magneto-optical recording medium capable of effectively overcoming the above-described problems associated with using a blue-violet laser beam for readout of the recording medium, among other problems.

The present invention provides a magneto-optical recording medium having at least a reproduction layer and a recording layer on a substrate thereof, and on which data-reproduction based on a magnetically induced super-resolution readout method utilizing a blue-violet laser beam is carried out. The substrate has a base surface on which the reproduction layer and the recording layer, that is, recording/reproducing magnetic layers, may be formed, or on which a dielectric film is formed (this dielectric film is referred to as the "first dielectric film" hereinafter) such that the dielectric film has a surface roughness (Ra) of 0.3 nm or less. It is noted that "Ra" means an average center roughness as defined in JIS B0601, and is merely referred to as "surface roughness" in this specification.

Recording on the magneto-optical recording medium, so as to form an information mark (magnetic domain) according to the present invention may be carried out in accordance with a light intensity modulation or a magnetic field modulation.

Reproduction (readout) of a recorded data signal on the magneto-optical recording medium is carried out in accordance with the magnetically induced super resolution readout process, preferably utilizing a blue-violet laser beam. In the present invention, the above-described surface roughness is selected for a preferred structure, which reduces noise, and thus, improves the C/N ratio and the jitter associated with recording or reproducing of the data signal on the magneto-optical recording medium.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 4 is a table showing measurement results of reproduction utilizing a red laser beam having a wavelength of 635 nm;

FIG. 5 is a table showing measurement results of reproduction utilizing a blue-violet laser beam having a wavelength of 406 nm;

FIG. 6 is a table showing measurement results of testing the magneto-optical recording media according to a first embodiment and a first comparative example of the present invention;

FIG. 7 is a table showing measurement results of testing the magneto-optical recording media according to a second and a third embodiments and a second comparative example of the present invention; and FIG. 8 is a table showing measurement results of testing the magneto-optical recording media according to a fourth embodiment and a third and a fourth comparative examples of the present invention.

DESCRIPTION OF THE PREFERRED EMBODIMENTS

Figure 1:
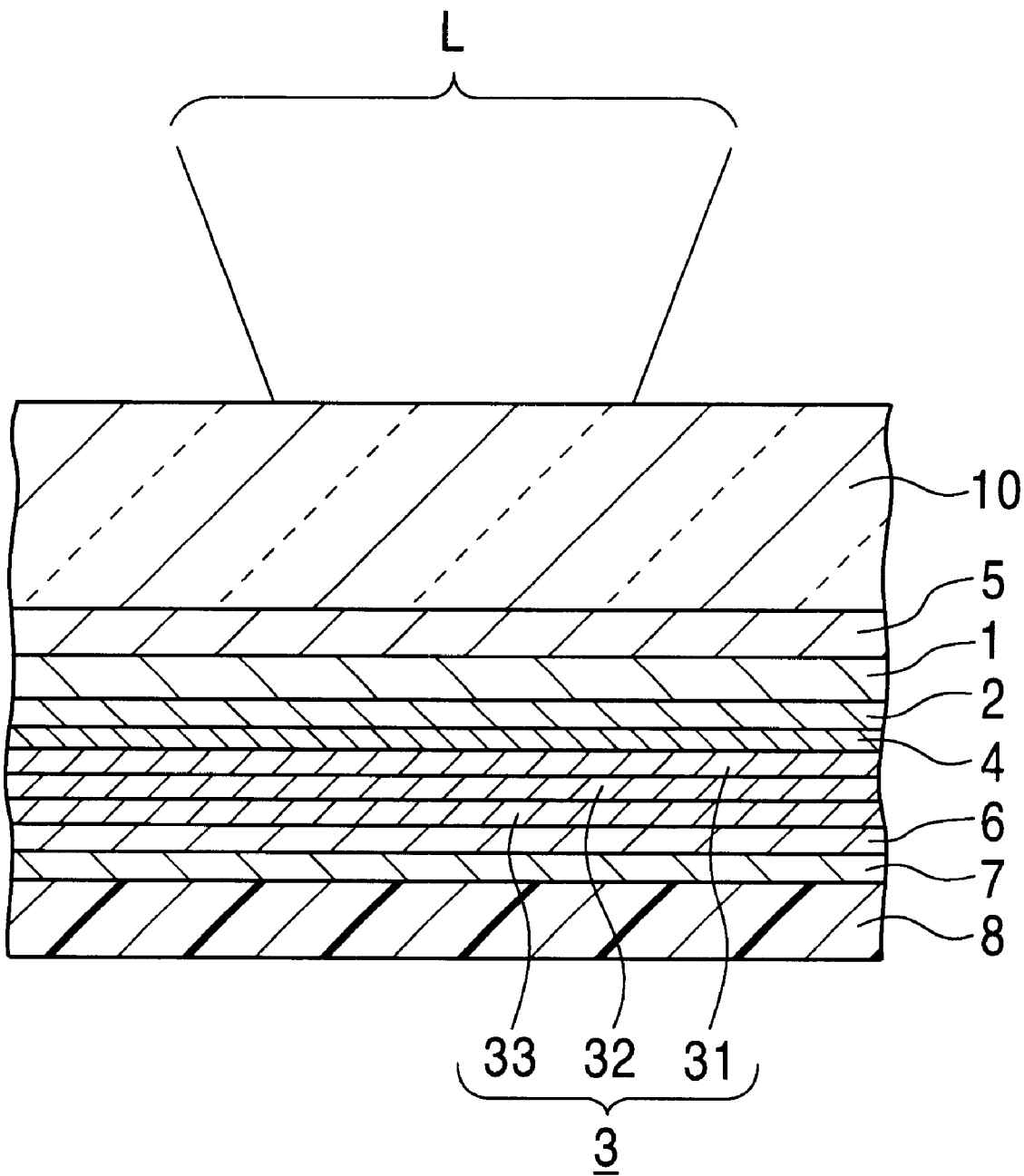
FIG. 1 is a schematic cross-sectional view of an exemplary magneto-optical recording medium according to the present invention.

A magneto-optical recording medium embodying principles of the present invention may utilize the magnetically induced super resolution readout process for recording and reproducing a data signal on the magneto-optical recording medium with improved C/N ratio and reduced jitter associated with the data signal. In particular, reproduction or recording of the data signal on the magneto-optical recording medium may be carried out by utilizing a blue-violet laser beam (that is, a laser beam having a wavelength of 350 nm to 450 nm) to further increase the density of recorded data signal on the magneto-optical recording-medium.

The magnetically induced super resolution readout process that may be applied to the magneto-optical recording medium of the present invention may also include the following: the CAD-MSR method (the center aperture detection magnetically induced super resolution method) which was previously described above; a front-aperture detection magnetically induced super resolution method (this will merely be called FAD-MSR in the following description) which is described in Japanese Patent Application Publication Laid-Open HEISEI-9-171643/1997; a rear-aperture detection magnetically induced super resolution method (this will merely be called RAD-MSR in the following description) which is described in Japanese Patent Application Publication Laid-Open HEISEI-3-093058/1991; a basic application of the U.S. Pat. No. 5,168,482; a domain-wall displacement detection method (this will merely be called DWDD in the following description) which was described in Japanese Patent Application Publication Laid-Open HEISEI-6-290496/1994, a basic application of the U.S. Pat. No. 6,027,825; and a magnetic amplifying magneto-optical system (MAMMOS) described in Japanese Patent Application Publication Laid-Open HEISEI-8-7350/1998.

A magnetically induced super resolution readout may be carried out on the magneto-optical recording medium according to the present invention, and the laser beam utilized in such a case is preferably the above-described blue-violet laser beam having a short wavelength. In one implementation, a magneto-optical recording medium embodying principles of the present invention includes a substantially transparent substrate that has a base surface on which recording/reproducing magnetic layers having at least a reproduction layer and a recording layer are formed. In this implementation, the base surface of the substrate has a surface roughness of 0.3 nm or less. In another implementation, a magneto-optical recording medium embodying principles of the present invention includes a substantially transparent substrate that has a base surface on which a first dielectric film is formed. In this other implementation, the first dielectric film has a surface roughness of 0.3 nm or less.

As further described below, either of the above-identified implementations may be employed in the two exemplary embodiments of the magneto-optical recording mediums of the present invention depicted in FIGS. 1 and 2.

Recording on the magneto-optical recording medium of the present invention may be carried out by a conventional recording method using a magneto-optical recording apparatus used for a conventional magneto-optical recording medium. For example, a light intensity modulation method or a magnetic field modulation method may be applied.

One aspect of the present invention is a magneto-optical recording medium on which a reproduction (readout) is carried out in accordance with CAD-MSR utilizing a blue-violet laser beam. By irradiating the laser beam onto a reproduction layer, a magnetized status signal of the reproduction layer is converted into an optical signal by a magneto-optical effect (the Kerr effect or the Faraday effect) to be read out. When carrying out the magnetically induced super resolution readout, since perpendicular magnetization according to the magnetization direction in the recording layer may be found at a specific portion of the magneto-optical recording medium that is smaller than a reproducing laser spot diameter, it becomes possible to read out a signal having a period shorter than an optical diffraction limit.

Figure 3:
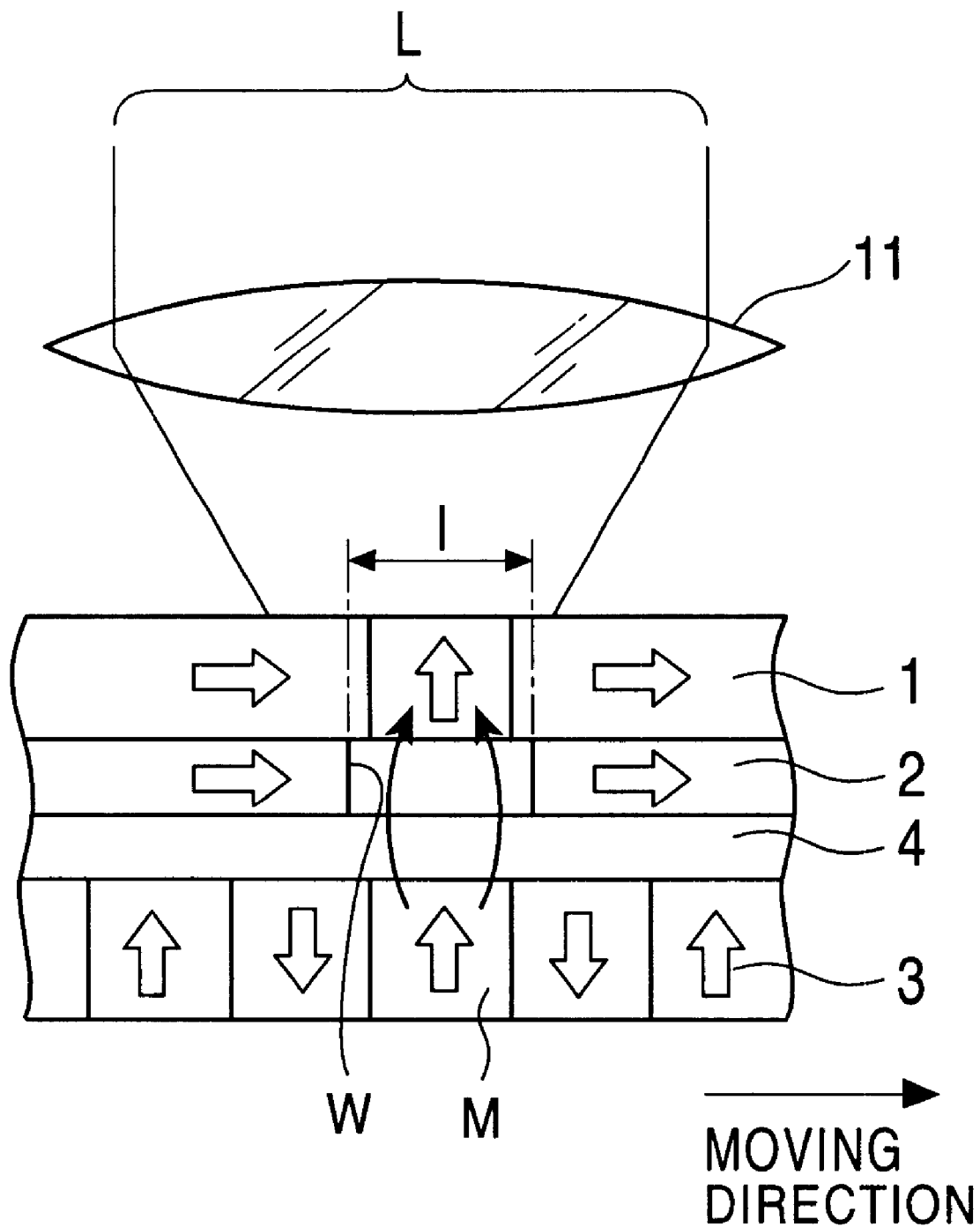
FIG. 3 depicts an example method of reproducing recorded data in accordance with the magnetically induced super-resolution readout method.

The reproduction (readout) method based on the CAD-MSR is carried out as shown in FIG. 3. In the present invention, a blue-violet laser beam having a wavelength of 350 nm to 450 nm is preferably used as a laser beam L.

As mentioned above, FIG. 1 depicts a schematic cross-sectional view of a second embodiment of the magneto-optical recording medium of the present invention. While aspects of the present invention may be employed in either of the two embodiments shown in FIGS. 1 and 2, for clarity only FIG. 1 will be described in further detail. It should be noted however that the scope of the invention is not solely restricted within the illustrated structures.

In the implementation of the magneto-optical recording medium shown in FIG. 1, the magneto-optical recording medium includes a substantially transparent substrate 10, which may be made of polycarbonate resin. The magneto-optical recording medium further includes a first dielectric film 5, a reproduction (readout) layer 1, an auxiliary reproduction layer 2, an non-magnetic intermediate layer 4, a recording layer 3, a second dielectric film 6, and a thermal-control layer 7 sequentially laminated on a surface of the substantially transparent substrate 10. In addition, a protection layer 8 may be superficially formed by way of covering a top surface thereof.

In FIG. 1, the recording layer 3 comprises a first magnetic film 31, a second magnetic film 32 and a third magnetic film 33. In this embodiment of the present invention, each of the first, second and third magnetic films 31–33 comprises a rare-earth transition-metal magnetic film whose composition ranges from compensation composition to transition-metal-predominant composition at room temperature. The recording layer 3 may be made to have high saturated magnetization in a desired temperature range, in combination of the three magnetic films.

According to the result of trial application of the CAD-MSR reproduction method using the magneto-optical recording medium of the present invention, it was confirmed that the C/N (carrier level against noise-level) ratio is improved and the jitter value is 5 decreased.

Next practical forms of the present invention will be described below by referring to actual embodiments of the inventive magneto-optical recording medium. It should be understood however that the scope of the embodiments of the invention is not solely limited to the exemplification shown below.

Embodiment 1

By setting a mold temperature at the time of forming a polycarbonate substrate by injection molding to be 120° C., as a molding condition of an injection molding machine which utilizes a nickel stamper, a substantially transparent substrate 10 having a surface roughness Ra of 0.25 nm may be formed. The surface roughness may be measured by an atomic force microscope (AFM). In this embodiment, the transparent substrate 10 has a diameter of 120 mm and a thickness of 0.6 mm and also has track grooves (guide grooves) having a track pitch of 0.40 μm formed thereon. Next, as shown in FIG. 1, the first dielectric film 5, the reproduction layer 1, the auxiliary reproduction layer 2, the non-magnetic intermediate layer 4, the recording layer 3, the second dielectric film 6, and the thermal control layer 7, are sequentially laminated on the transparent substrate 10. In addition, a protection layer 8 is formed by way of superficially covering the top surface of the thermal control layer 7.

The layers of the magneto-optical recording medium shown in FIG. 1 are individually formed via the processes described below. Initially, targets comprising Si, Tb, Gd, FeCo, Fe, and Al are respectively secured to a magnetron sputtering apparatus incorporating a pair of vacuum chambers. Next, the transparent substrate 10 is secured to a substrate holder, and then, air remaining in the vacuum chambers is fully evacuated via a cryopump until high vacuum below $1 \times 10^{-5}$ (Pa) is eventually generated.

Next while evacuating air out from the first vacuum chamber, 50 (sccm) of argon gas and 30 (sccm) of $N_2$ gas are respectively fed into the first vacuum chamber, and then, after adjusting a main valve until pressure inside of the first vacuum chamber reached 0.24 (Pa), by applying RF reactive sputtering process onto Si target, a silicon nitride film is formed on the transparent substrate 10 to be 40 nm in thickness, thus completing formation of the first dielectric film 5.

Next, the valves for feeding argon gas and $N_2$ gas are respectively closed, and then, the substrate holder is transferred from the first vacuum chamber to the second chamber. Then, air remaining in the second vacuum chamber is fully evacuated by the cryopump until high vacuum below $1 \times 10^{-5}$ (Pa) is eventually generated.

Next, while evacuating air out from the second vacuum chamber, 100 (sccm) of argon gas is fed into the second vacuum chamber. After adjusting the main valve until pressure inside of the second vacuum chamber reached 0.12 (Pa), by applying DC-sputtering process, the reproduction layer 1 of 30 nm thick GdFeCo, the auxiliary reproduction layer 2 of 8 nm thick GdFe, the non-magnetic intermediate layer 4 of 4 nm thick Al, the first magnetic film 31 of 10 nm thick GdFeCo of the recording layer 3, the second magnetic film 32 of 30 nm thick TbFeCo of the recording layer 3, and the third magnetic film 33 of 30 nm thick TbFeCo of the recording layer 3 are sequentially laminated on the first dielectric film 5.

Next, the valve for feeding argon gas is closed, and then the substrate-holder is transferred from the second vacuum chamber to the first vacuum chamber. Then, while placing the substrate holder inside of the first vacuum chamber, air remaining in the second vacuum chamber is fully evacuated by the cryopump until high vacuum below $1 \times 10^{-5}$ (Pa) is eventually generated.

Next, while evacuating air out from the first vacuum chamber, 50 (sccm) of argon gas and 30 (sccm) of $N_2$ gas are fed into the first vacuum chamber. After adjusting the main valve until pressure inside of the first vacuum chamber reached 0.24 (Pa), by applying RF reactive sputtering process onto Si target, silicon nitride film is formed to be 20 nm in thickness, thus completed formation of the second dielectric film 6.

Next, the valves for feeding argon gas and $N_2$ gas are respectively closed, and then, air remaining in the first vacuum chamber is fully evacuated by the cryopump until high vacuum below $1 \times 10^{-5}$ (Pa) is eventually generated.

Then, while evacuating air out from the first vacuum chamber, 100 (sccm) of argon gas is fed into the first vacuum chamber, and then, after adjusting the main valve until pressure inside of the first vacuum chamber reached 0.23 (Pa), by applying DC-sputtering process, the thermal control layer 7 of 40 nm thick aluminum is formed on the second dielectric film 6.

The composition of each of the above described magnetic layers and metal layers are determined by adjusting the power to be applied on each target.

Next, the transparent substrate 10 on which the above component films are laminated is drawn out of the vacuum chamber. Finally, the protection film 8 for protecting the thermal control layer 7 comprising aluminum is formed to be 20 μm in thickness with ultraviolet-ray-cured resin via coating followed by final curing of the coated resin via irradiation with UV-rays.

As a result of implementing the above serial processes, the magneto-optical recording medium is formed.

In this case, the composition of GdFeCo of the reproduction layer 1 is adjusted to show in-plane magnetization at room temperature and perpendicular magnetization at 150° C. or more, and to have the Curie temperature of 350° C.

The composition of GdFe of the auxiliary reproduction layer 2 is adjusted to be an in-plane magnetized film of transition-metal-predominant composition from room temperature to the Curie temperature and to have the Curie temperature of 150° C.

As for the first magnetic film 31 of the recording layer 3, the composition of GdFeCo is adjusted to be a perpendicular magnetized film of transition-metal-predominant composition from room temperature to the Curie temperature and to have the Curie temperature of 300° C.

As for the second magnetic film 32 of the recording layer 3, the composition of TbFeCo is adjusted to be a perpendicular magnetized film of transition-metal-predominant composition from room temperature to the Curie temperature and to have the Curie temperature of 280° C.

As for the third magnetic film 33 of the recording layer 3, the composition of TbFeCo is adjusted to be a perpendicular magnetized film of transition-metal-predominant composition from room temperature to the Curie temperature and to have the Curie temperature of 300° C.

The magneto-optical recording medium will be referred to as an optical disk No. 1 in the following description.

Comparative Example 1

A magneto-optical recording medium is formed in the same method and structural arrangement of the first embodiment except for the molding condition of the injection molding machine which utilizes a nickel stamper. In this case, the mold temperature is set to be 135° C. as opposed to 120° C. and a substantially transparent substrate 10 is made to have a surface roughness Ra of 0.35 nm as opposed to 0.25 nm. This embodiment of the magneto-optical recording medium will be referred to as an optical disk No. 2 in the following description.

Both the optical disk No. 1 and the optical disk No. 2 showed good magnetically induced super resolution readout characteristics, in a case where a read laser beam having a wavelength of 635 nm is used as a reproducing laser beam in the above-described measurement.

FIG. 6 shows the results of recording noise level, C/N ratio and jitter measured by a magneto-optical recording/reproducing apparatus using a blue-violet laser beam as described above, with regard to the optical disk No. 1 and the optical disk No. 2.

The surface roughness is measured with an atomic force microscope (AFM).

The measured track pitch is 0.40 μm, as described above, and the jitter is measured at a bit length of 0.19 μm and the C/N ratio is measured at mark lengths of 0.25 μm and 1.0 μm.

As apparent from FIG. 6, despite that optical disk No. 1 and optical disk No. 2 are each a CAD-MSR medium having magnetic layers formed on a respective substrate under similar adjusted and optimized conditions, there is some difference in noise level in accordance with the surface roughness of the respective substrates. That is, the less the surface roughness is, the more the noise level is suppressed, which results in higher C/N ratio and less jitter.

Embodiment 2

Next, a polycarbonate substrate formed under a molding condition of a mold temperature at 145° C. and to have a surface roughness Ra of 0.38 nm is prepared.

The surface roughness of the substrate is changed by ultraviolet irradiation using an ultraviolet lamp. In this embodiment, "UVO-CLEANER 144A-100" manufactured by Technovision Inc. is used as a UV irradiation apparatus. The ultraviolet lamp is a low-pressure mercury grid lamp and has a lamp output of 20 mW/cm$^2$. The main UV wavelengths are 184.4 nm and 253.7 nm. The UV irradiation is carried out in a nitrogen gas atmosphere.

Using the above-described UV irradiation apparatus, ultraviolet irradiation is carried out on the polycarbonate substrate having the surface roughness of 0.38 nm for five minutes to have a surface roughness Ra of 0.25 nm. The obtained polycarbonate substrate having the surface roughness of 0.25 nm is used as the transparent 5 substrate 10.

The magneto-optical recording medium formed in the same way as the Embodiment 1 with this transparent substrate 10 will be referred to as an optical disk No. 3.

Embodiment 3

The embodiment 3 is also based on the method and structural arrangement identical to those which are provided for the Embodiment 2 except for the surface roughness Ra of the transparent substrate 10 being 0.30 nm, which is obtained by carrying out the LV irradiation on a polycarbonate substrate having a surface roughness of 0.38 nm for five minutes using the UV irradiation apparatus. The magneto-optical recording medium of the embodiment 3 will be referred to as an optical disk No. 4 in the following description.

Comparative Example 2

The comparative example is also based on the method and structural arrangement identical to those provided for the Embodiment 2 except for the surface roughness Ra of the transparent substrate 10 being 0.38 nm without UV irradiation. The magneto-optical recoding medium of the comparative example 2 will be referred to as an optical disk No. 5.

FIG. 7 shows the measurement results of reproduction characteristics as described above, with regard to the optical disks No. 3 to No. 5.

FIG. 7 also shows that the less the surface roughness is, the more the noise level is suppressed. As a result higher C/N ratio and less jitter are measured.

The above-described embodiments and example show cases where the surface roughness of the substrate is changed. In place of changing the surface roughness of the substrate 10, a surface roughness of the first dielectric film 5 formed on the substrate 10 may be selectively changed.

Embodiment 4

Next, a polycarbonate substrate formed under a molding condition of a mold temperature at 125° C. and to have a surface roughness Ra of 0.30 nm is prepared.

Using the same film forming apparatus as used in the Embodiment 1, silicon nitride film having a thickness of 40 nm is formed on the substrate 10 as the first dielectric film 5. The film forming condition is as follows: while evacuating air out from the first vacuum chamber, 50 (sccm) of argon gas and 30 (sccm) of $N_2$ gas are respectively fed into the first vacuum chamber, then, a main valve is adjusted until pressure inside of the first vacuum chamber reaches 0.24 (Pa). The obtained first dielectric film 5 has a surface roughness Ra of 0.30 nm. The other method and structural arrangement are identical to those provided for the Embodiment 1. The magneto-optical recording medium will be referred to as an optical disk No. 6.

Comparative Examples 3 and 4

In the comparative examples 3 and 4, based on the method and structural arrangement identical to those provided for the Embodiment 4 except for adjusting the main valve to have the pressure inside the chamber of 0.34 (Pa) and 0.44 (Pa), respectively, and to have surface roughness Ra's of the first dielectric film 5 to be 0.48 nm and 0.69 nm, magneto-optical recording media are formed. These magneto-optical recording media will be referred to as optical disks No. 7 and No. 8, respectively. FIG. 8 shows the measurement results of C/N ratio, noise and jitter according to the same measurement method as described above, with regard to the optical disks No. 6 to No. 8.

As is apparent from FIG. 8, the more the value of the surface roughness is, the more the characteristic degrades.

In a case where a red laser beam is used as a reproducing laser beam, all of the optical disks No. 6 to No. 8 show good magnetically induced super resolution readout characteristics.

As is clear from the above description, it is possible to realize a magneto-optical recording medium showing higher C/N ratio, smaller value of jitter, and higher reproducing power margin and recording power margin even in a case of using a blue-violet laser beam having a short wavelength in magnetically induced super resolution readout method by forming the surface of the substrate or the surface of the first dielectric film formed thereon to have a surface roughness of 0.3 nm or less.

Figure 2:
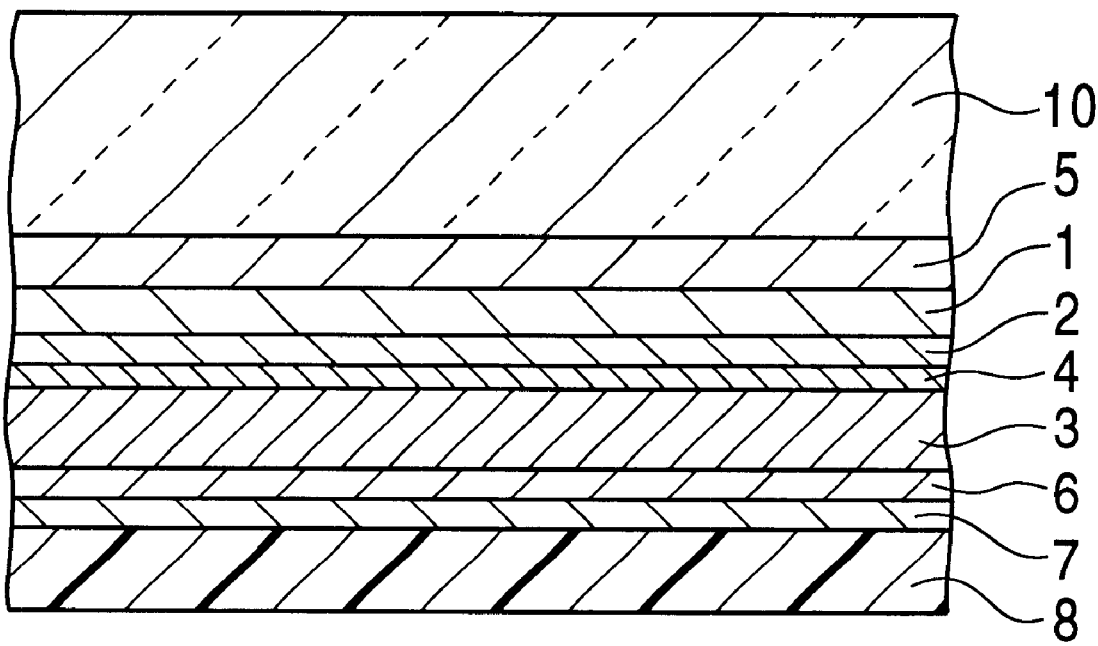
FIG. 2 is a schematic cross-sectional view of another exemplary magneto-optical recording medium according to the present invention.

Although the recording layer 3 is a triple-layer structure in the embodiments 1–4, the recording layer 3 may be a single-layer structure as shown in FIG. 2.

In the above-referred practical aspects for embodying the present invention, magnetically induced super resolution readout based on the CAD-MSR method is carried out. However, the present invention also provides excellent effect when being used as a magneto-optical recording medium which is subject to magnetically induced super resolution readout process including a process of transferring the recorded mark from the recording layer onto the reproduction layer, such as FAD-MSR, RAD-MSR, or DWDD, or MAMMOS, or the like. When executing any of these methods, the objective recording medium comprises at least a reproduction layer and a recording layer comprising multiple layer-built films. However, composition of the layer-components may be subject to a variety of changes or modifications.

As described above, according to the present invention, it is possible to provide a magneto-optical recording medium improved in its property in C/N ratio, jitter and reproducing power margin, and capable of reproducing signals under the diffraction limit of light excellently, in a case of being subject to magnetically induced super resolution readout capable of reproduction beyond the diffraction limit of light and intending higher density recording by utilizing a blue-violet laser beam.

Although the invention has been described in its preferred form with a certain degree of particularity, obviously many changes and variations are possible therein. It is therefore to be understood that the present invention may be practiced otherwise than as specifically described herein without departing from the scope and the spirit thereof.

What is claimed is:

1. A magneto-optical recording medium comprising:
   a transparent substrate having a surface;
   a reproduction layer formed over the surface of said substrate; and
   a recording layer formed over said reproduction layer,
   wherein said substrate surface has a surface roughness Ra of 0.3 nm or less,
   said reproduction layer having in-plane magnetization at room temperature and perpendicular magnetization at 150° C. or more; and
   said recording layer comprises a first, second and third magnetic films, each made of a rare-earth transition-metal magnetic film being a perpendicular magnetized film having a transition-metal-predominant composition from room temperature to the Curie temperature.

2. The magneto-optical recording medium according to claim 1, wherein when recording a data signal to have a mark length of 1.0 μm or less on said recording layer and when reproducing said data signal using a blue-violet laser beam, said data signal has an associated jitter of 10% or less.

3. The magneto-optical recording medium according to claim 1, wherein when recording a data signal to have a mark length of 1.0 μm or less on said recording layer and when reproducing said data signal using a blue-violet laser beam, said data signal has an associated noise level of −66.0 dBm or less.

4. The magneto-optical recording medium according to claim 1, wherein when recording a data signal to have a mark length of 1.0 μm or less on said recording layer and when reproducing said data signal using a blue-violet laser beam, said data signal has an associated C/N level of 43 dBM or higher.

5. The magneto-optical recording medium according to claim 1, wherein said second magnetic film has a Curie temperature that is approximately 20° C. below the Curie temperature of the first magnetic film.

6. The magneto-optical recording medium according to claim 5, wherein said first and said second magnetic films each have a Curie temperature of about 300° C.

7. A magneto-optical recording medium comprising
a transparent substrate;
a reproduction layer formed over the substrate;
a recording layer formed formed over the reproduction layer; and
a dielectric film formed between said substrate and said reproduction layer, the dielectric film having a surface roughness Ra of 0.3 nm or less, said reproduction layer having in-plane magnetization at room temperature and perpendicular magnetization at 150° C. or more; and
said recording layer comprises a first, second and third magnetic films, each made of a rare-earth transition-metal magnetic film being a perpendicular magnetized film having a transition-metal-predominant composition from room temperature to the Curie temperature.

8. The magneto-optical recording medium according to claim 7, wherein when recording a data signal to have a mark length of 1.0 μm or less on said recording layer and when reproducing said data signal using a blue-violet laser beam, said data signal has an associated jitter of 10% or less.

9. The magneto-optical recording medium according to claim 7, wherein when recording a data signal to have a mark length of 1.0 μm or less on said recording layer and when reproducing said data signal using a blue-violet laser beam, said data signal has an associated noise level of −65 dBm or less.

10. The magneto-optical recording medium according to claim 7, wherein when recording a data signal to have a mark length of 1.0 μm or less on said recording layer and when reproducing said data signal using a blue-violet laser beam, said data signal has an associated C/N level of 50 dBM or higher.

* * * * *